(12) United States Patent
Hong et al.

(10) Patent No.: US 9,845,104 B2
(45) Date of Patent: Dec. 19, 2017

(54) STEERING COLUMN TILTING DEVICE

(71) Applicant: NAMYANG IND. CO., LTD, Ansan-si, Gyeonggi-do (KR)

(72) Inventors: Sung Jong Hong, Seoul (KR); Jeong Nam Lee, Daejeon (KR)

(73) Assignee: NAMYANG IND. CO., LTD, Ansan-si, Gyeonggi-do (KR)

( * ) Notice: Subject to any disclaimer, the term of this patent is extended or adjusted under 35 U.S.C. 154(b) by 0 days.

(21) Appl. No.: 15/117,988

(22) PCT Filed: Feb. 10, 2015

(86) PCT No.: PCT/KR2015/001314
§ 371 (c)(1),
(2) Date: Aug. 10, 2016

(87) PCT Pub. No.: WO2015/119475
PCT Pub. Date: Aug. 13, 2015

(65) Prior Publication Data
US 2017/0008545 A1    Jan. 12, 2017

(30) Foreign Application Priority Data

Feb. 10, 2014    (KR) .................. 10-2014-0014672

(51) Int. Cl.
*B62D 1/184*    (2006.01)
*B62D 1/187*    (2006.01)
*B62D 1/189*    (2006.01)

(52) U.S. Cl.
CPC ............. *B62D 1/184* (2013.01); *B62D 1/187* (2013.01); *B62D 1/189* (2013.01)

(58) Field of Classification Search
CPC .......... B62D 1/184; B62D 1/187; B62D 1/189
See application file for complete search history.

(56) References Cited

U.S. PATENT DOCUMENTS

| | | | |
|---|---|---|---|
| 5,787,759 A * | 8/1998 | Olgren .................. | B62D 1/184 |
| | | | 280/777 |
| 5,893,676 A * | 4/1999 | Yamamoto ............. | B62D 1/184 |
| | | | 403/321 |
| 6,419,269 B1 * | 7/2002 | Manwaring ............ | B62D 1/195 |
| | | | 280/775 |

(Continued)

FOREIGN PATENT DOCUMENTS

| KR | 10-0561086 B1 | 3/2006 |
|---|---|---|
| KR | 2006064840 A * | 6/2006 |

(Continued)

OTHER PUBLICATIONS

International Search Report for PCT/KR2015/001314 dated Apr. 30, 2015 from Korean Intellectual Property Office.

*Primary Examiner* — Laura Freedman
(74) *Attorney, Agent, or Firm* — Paratus Law Group, PLLC

(57) ABSTRACT

Disclosed herein is an apparatus for tilting a steering column, capable of smoothly guiding tooth-on-tooth between a moving gear moved along with a tilt shaft when an operating lever is operated such that a steering column tilts up and down, and a fixing gear fixed to a vehicle body. Consequently, it is possible to resolve faulty operation and prevent the emotional quality of product from deteriorating.

7 Claims, 9 Drawing Sheets

(56) References Cited

U.S. PATENT DOCUMENTS

| | | | |
|---|---|---|---|
| 7,717,011 B2 * | 5/2010 | Hirooka | B62D 1/184 280/777 |
| 7,752,940 B2 * | 7/2010 | Lutz | B62D 1/184 280/775 |
| 9,120,502 B2 * | 9/2015 | Mihara | B62D 1/184 |
| 9,156,490 B2 * | 10/2015 | Kwon | B62D 1/184 |
| 9,156,491 B2 * | 10/2015 | Okano | B62D 1/187 |
| 9,187,115 B2 * | 11/2015 | Kakishita | B62D 1/184 |
| 9,296,419 B2 * | 3/2016 | Oh | B62D 7/224 |
| 2008/0047385 A1 | 2/2008 | Oh | |
| 2008/0245176 A1 | 10/2008 | Manwaring et al. | |

FOREIGN PATENT DOCUMENTS

| | | | |
|---|---|---|---|
| KR | 10-2007-0109372 A | | 11/2007 |
| KR | 10-0854767 B1 | | 8/2008 |
| KR | 2011012337 A | * | 2/2011 |
| KR | 10-2013-0049297 A | | 5/2013 |
| KR | 10-2014-0009745 A | | 1/2014 |

* cited by examiner

STEERING COLUMN TILTING DEVICE

CROSS REFERENCE TO PRIOR APPLICATIONS

This application is a National Stage Patent Application of PCT International Patent Application No. PCT/KR2015/001314 (filed on Feb. 10, 2015) under 35 U.S.C. §371, which claims priority to Korean Patent Application No. 10-2014-0014672 (filed on Feb. 10, 2014), which are all hereby incorporated by reference in their entirety.

TECHNICAL FIELD

The present invention relates to an apparatus for tilting a steering column, capable of allowing a steering column, the position of which is set suitable for the physique or posture of a driver, to not tilt from the set position due to impact or vibration applied to a vehicle during the traveling thereof.

BACKGROUND ART

A conventional steering column is installed and tilted in a tilting apparatus. The tilting apparatus typically includes a tilt bracket which supports the column tube of the steering column, a mounting bracket which is installed in a predetermined portion of a vehicle and supports the tilt bracket such that the tilt bracket is movable up and down, and an operating lever which is mounted to the tilt bracket to fix the position of the tilt bracket relative to the mounting bracket. Thus, a user may move the tilt bracket for supporting the column tube to a predetermined position of the mounting bracket by operating the operating lever, so as to set the tilt bracket.

However, when impact or vibration is applied to the vehicle in the above structure, the tilt bracket for supporting the heavy column tube deviates from the set position while sliding from the mounting bracket. In this case, there is a problem in that the user operates the operating lever again to change the position of the tilt bracket.

Korean Patent No. 10-0561086 (hereinafter, referred to as "Prior Document") discloses a new apparatus for tilting a steering column in order to resolve the above problem.

The apparatus in the prior document includes a fixing part in which a mounting bracket is fixed to a predetermined portion of a vehicle, first and second side parts which respectively extend downward from both ends of the fixing parts, a gear guide groove which is formed in the first side part while having a gear formed on the inner peripheral surface thereof, and a slide guide groove which is formed in the second side part and corresponds to the gear guide groove.

In addition, a tilt bracket includes a tilt shaft which passes through the gear guide groove and the slide guide groove and has a brake gear formed on the outer peripheral surface thereof, the brake gear engaging with the gear guide groove, and a shaft movement part which axially moves the tilt shaft such that the brake gear is selectively engaged with the gear guide groove. An operating lever includes a lever shaft part which is organically coupled to the shaft movement part so as to axially move the tilt shaft, and a lever part which extends from the lever shaft part and is pushed by a user.

Particularly, the shaft movement part includes a first cam bush which is fixed to the first side part while the tilt shaft passing through the gear guide groove passes through the first cam bush, a second cam bush through which the tilt shaft passes in the state in which it is pressed against the first cam bush, a nut which is coupled to the tilt shaft passing through the slide guide groove, and a Belleville spring which is installed between the nut and the second side part. The first and second cam bushes have first and second slopes which are formed on the facing surfaces thereof and are inclined to one side. The tilt shaft passing through the second cam bush and the second cam bush is fixed to the lever shaft part.

In the prior document that discloses the apparatus having the above configuration, when the driver changes the position of a steering wheel by operating the lever part of the operating lever, the first cam bush is close to the second cam bush by the first and second slopes, so that the tilt shaft, which is elastically biased by the Belleville spring, moves to the Belleville spring, and the brake gear is disengaged from the gear guide groove. In this state, the user may operate such that the steering column is located at a specific position by moving the tilt bracket in upward and downward directions relative to the mounting bracket.

However, in the prior document, the first and second cam bushes have to be separately manufactured in a special form that has the first and second slopes, and the brake gear may not be smoothly engaged with the gear guide groove, due to the complicated engagement structure thereof, when the distance between the first and second cam bushes is increased and then decreased. For this reason, consumers may be adversely affected by faulty operation, and the emotional quality of product may be deteriorated due to occurrence of dull mechanical friction noise.

DISCLOSURE

Technical Problem

Accordingly, the present invention has been made in view of the above-mentioned problems, and an object thereof is to provide an apparatus for tilting a steering column, capable of smoothly adjusting a position of a tilt bracket through operation of an operating lever, preventing occurrence of mechanical friction noise, and having a simple structure.

Technical Solution

In accordance with an aspect of the present invention, an apparatus for tilting a steering column includes a tilt bracket coupled to a mounting bracket, for fixing a steering column tube in a predetermined portion of a vehicle, with the column tube interposed therebetween, so that the column tube tilts in a tele-out and tele-in manner relative to the mounting bracket when an operating lever is operated, a tilt shaft, one end of which is connected to the operating lever arranged outside a first side part of the tilt bracket, the other end thereof extending outward through the first side part and a second side part facing the first side part, and a fixation-holding unit including a fixing gear and a moving gear coupled to the second side part, and coupled to the other end of the tilt shaft extending through the second side part, thereby enabling the tilt bracket to be tilted or not tilted while the fixing gear and the moving gear come into contact with or are decoupled from each other when the operating lever is operated.

The fixing gear may be fixed outside the second side part of the tilt bracket, and the moving gear may be arranged to be rotatable about a rotary shaft provided in the fixing gear and be movable along the rotary shaft. The moving gear comes into contact with or is decoupled from one surface of the fixing gear while rotating when the tilt shaft, which is arranged to be axially and longitudinally movable, is axially moved during operation of the operating lever.

The fixation-holding unit may further include a guide protrusion in order to prevent poor contact and contact noise through first contact of the guide protrusion when the fixing gear comes into contact with the moving gear.

A rack gear part for engaging with the moving gear may be formed on one surface of the fixing gear facing the moving gear, a stopper gear part engaging with the rack gear part may be formed on one surface of the moving gear facing the fixing gear, and the guide protrusion may be one of a plurality of gear teeth forming the stopper gear part.

The guide protrusion may be located at an intermediate one of the gear teeth forming the stopper gear part.

The guide protrusion may have the same shape as one of the gear teeth forming the stopper gear part, and extend further than the stopper gear part by a predetermined length in a direction of the rotary shaft.

Alternatively, a rack gear part for engaging with the moving gear may be formed on one surface of the fixing gear facing the moving gear, and a thread valley of the rack gear part may have a depth and a width which are gradually increased toward the rotary shaft. In addition, a stopper gear part engaging with the rack gear part may be formed on one surface of the moving gear facing the fixing gear, and a thread ridge of the stopper gear part may have a shape that engages with the thread valley of the rack gear part.

The stopper gear part may extend further than the rack gear part by a predetermined length in a direction of the rotary shaft.

Advantageous Effects

In accordance with an apparatus for tilting a steering column according to exemplary embodiments of the present invention, it is possible to minimize an area of a first contact portion during tooth-on-tooth between a fixing gear and a moving gear of a fixation-holding unit, thereby preventing occurrence of mechanical noise. In addition, it is possible to guide the tooth-on-tooth between the fixing gear and the moving gear in place when an operating lever is operated, thereby resolving faulty operation.

BRIEF DESCRIPTION OF DRAWINGS

The above and other objects, features and other advantages of the present invention will be more clearly understood from the following detailed description taken in conjunction with the accompanying drawings, in which.

BEST MODE FOR INVENTION

Reference will now be made in detail to an apparatus for tilting a steering column according to embodiments of the present invention, examples of which are illustrated in the accompanying drawings.

Figure 1:
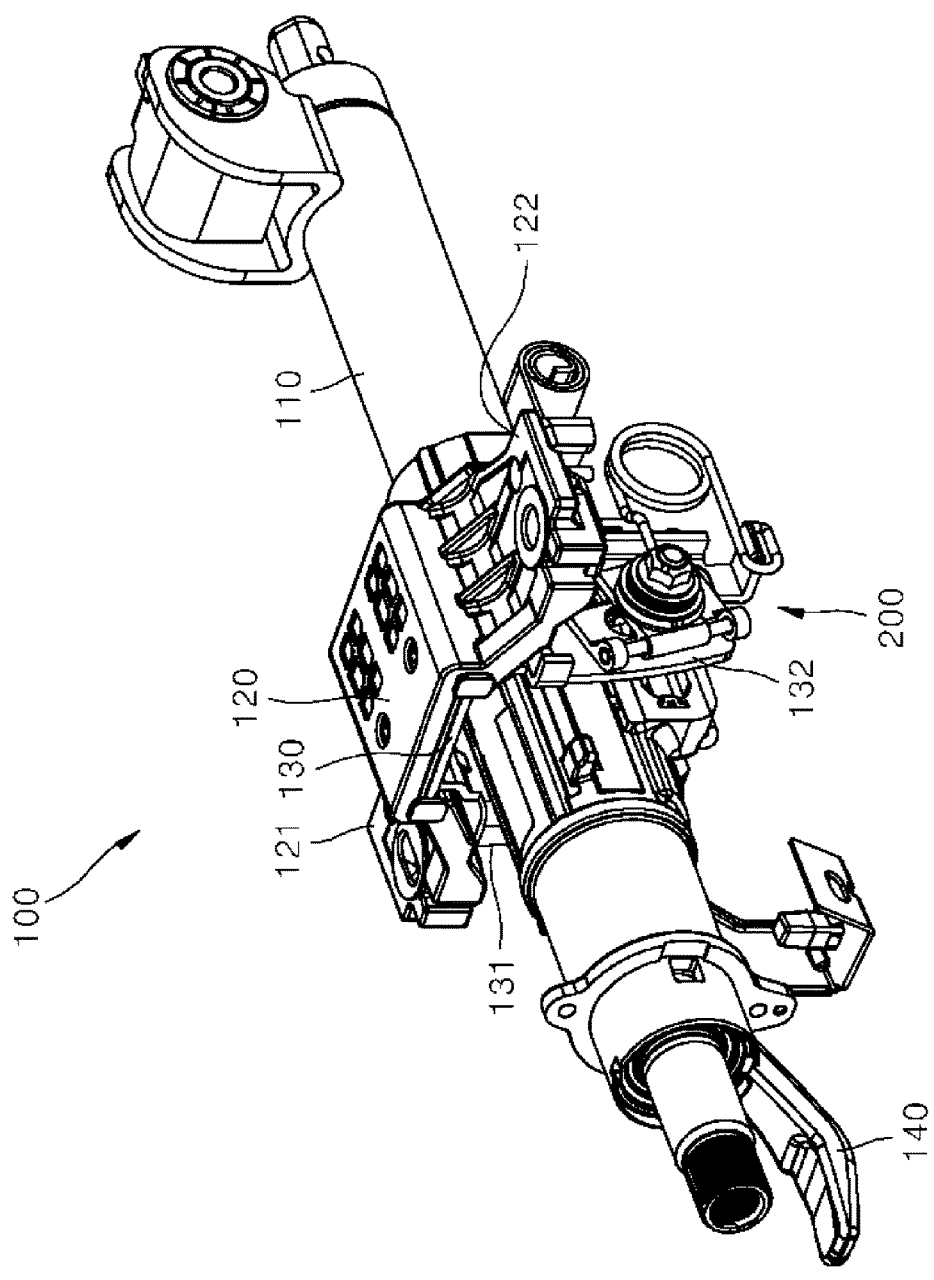
FIG. 1 is a perspective view illustrating an apparatus for tilting a steering column according to an embodiment of the present invention.
Figure 2:
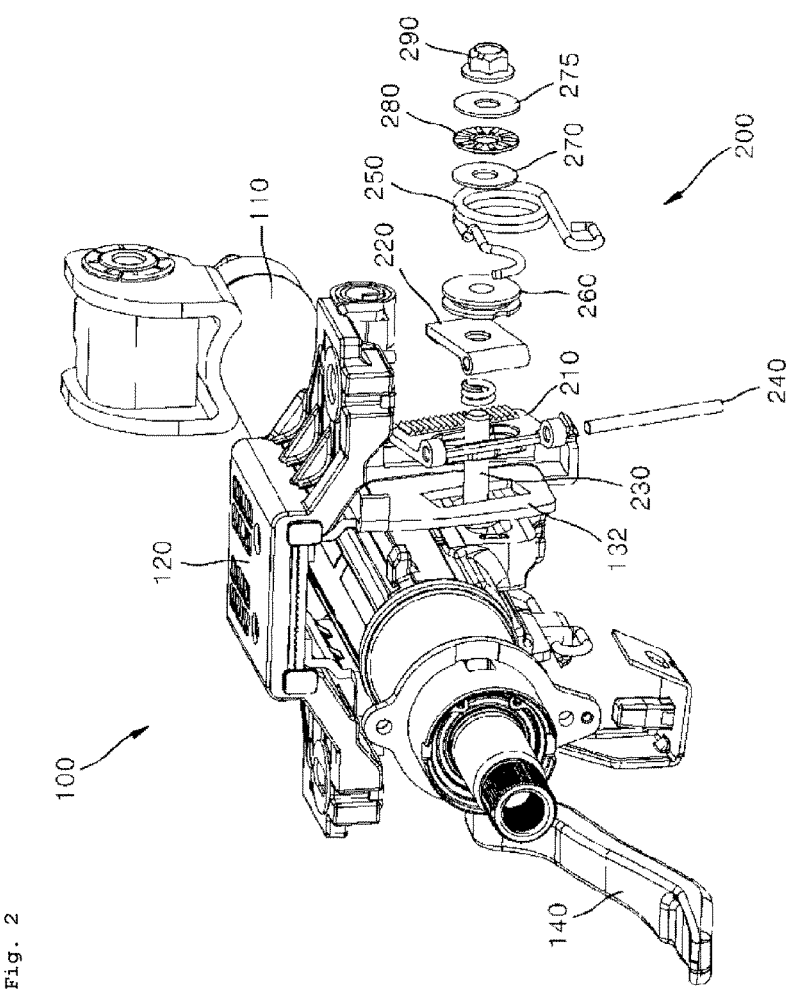
FIG. 2 is an exploded perspective view illustrating a state in which a portion of components of FIG. 1 is disassembled.
Figure 3:
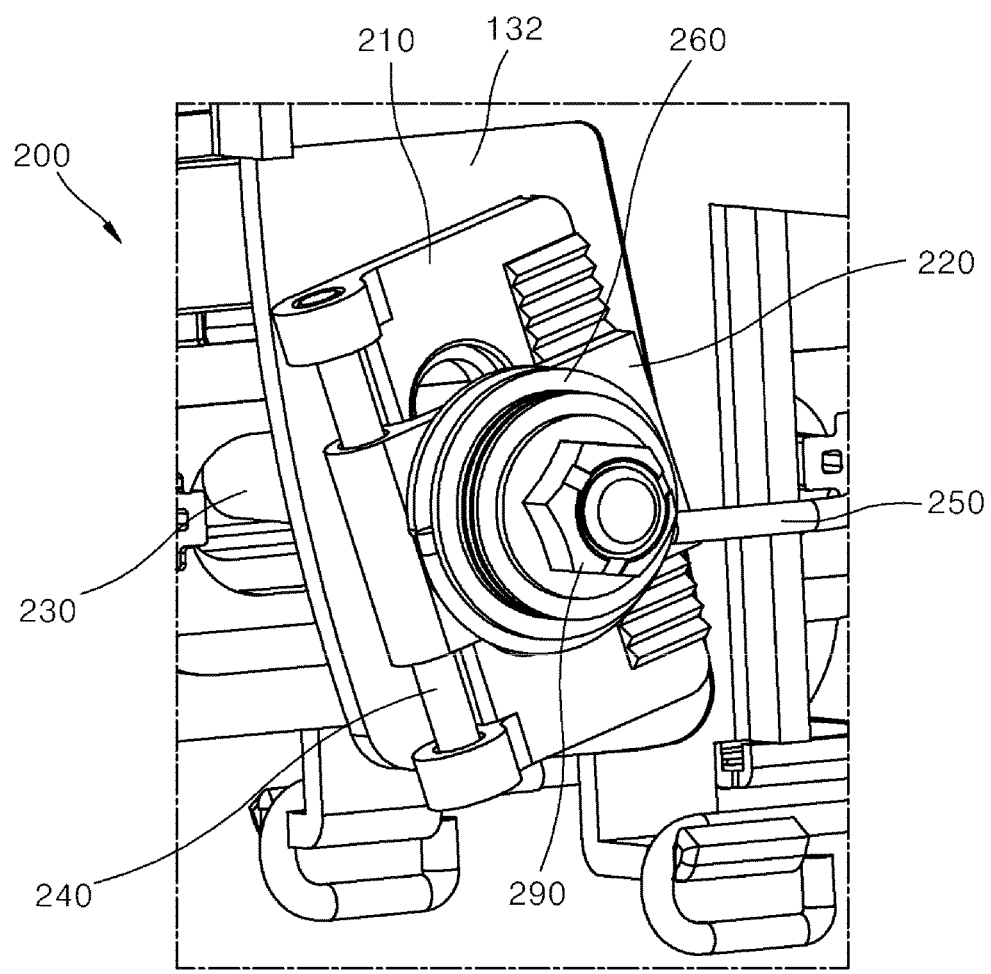
FIG. 3 is a perspective view illustrating a state in which a moving gear is engaged with a fixing gear, among the components of FIG. 1.
Figure 4:
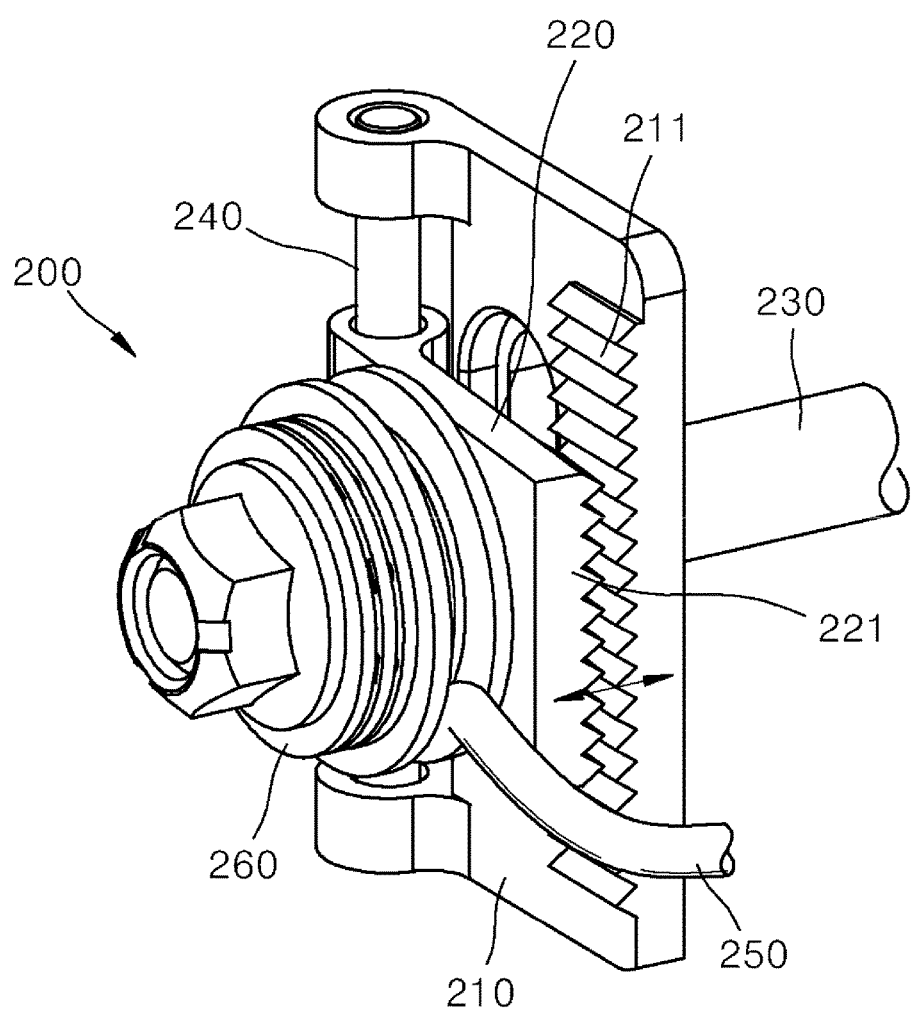
FIG. 4 is a perspective view illustrating a state in which the moving gear is disengaged from the fixing gear, among the components of FIG. 1.
Figure 5:
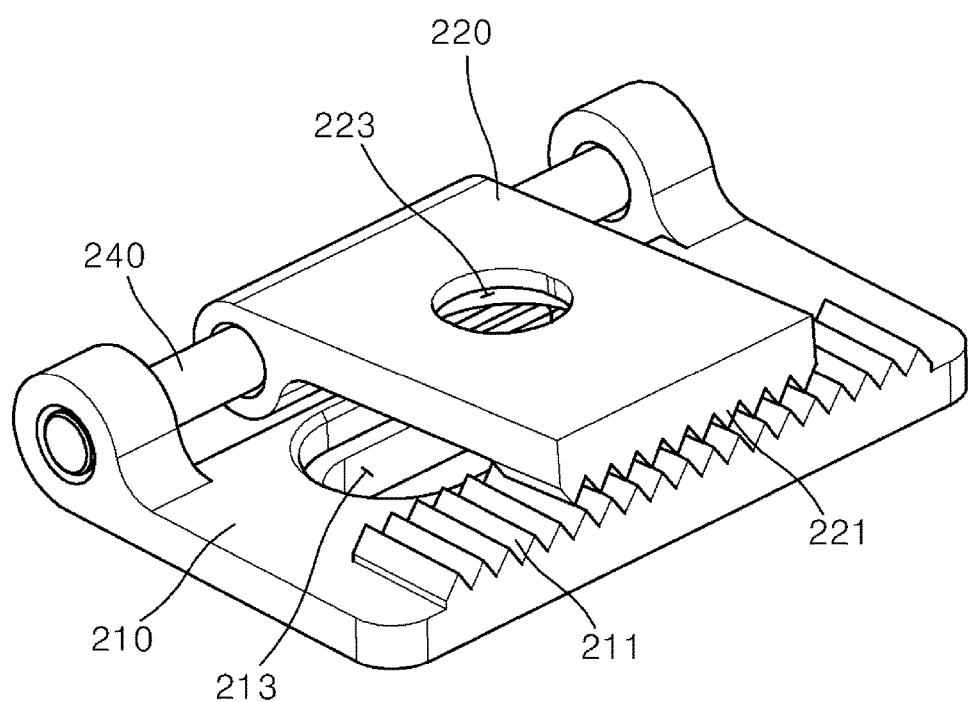
FIG. 5 is a perspective view illustrating a fixation-holding unit, among the components of FIG. 1.
Figure 6:
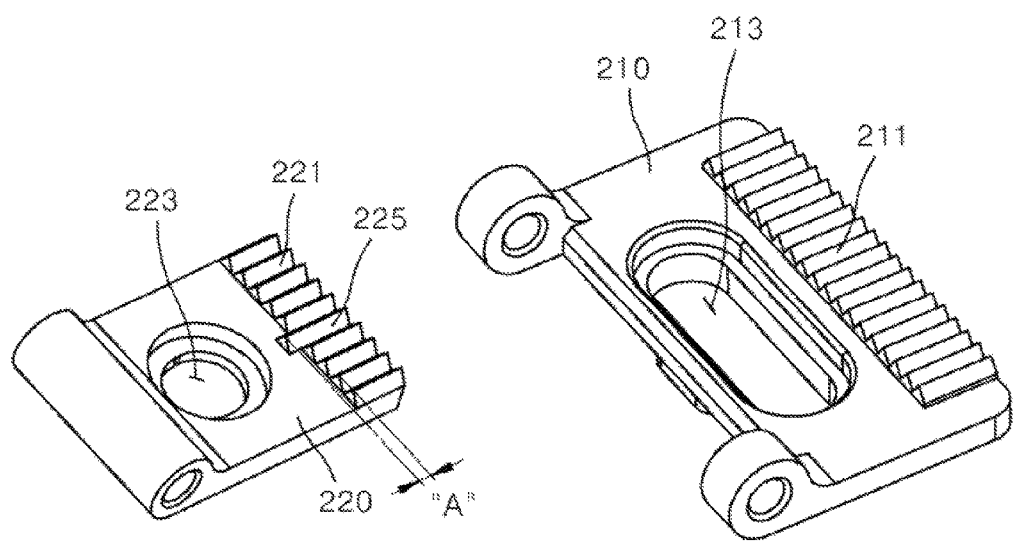
FIG. 6 is an exploded perspective view illustrating a preferable example of a fixation-holding unit in the apparatus for tilting a steering column according to the embodiment of the present invention.
Figure 7:
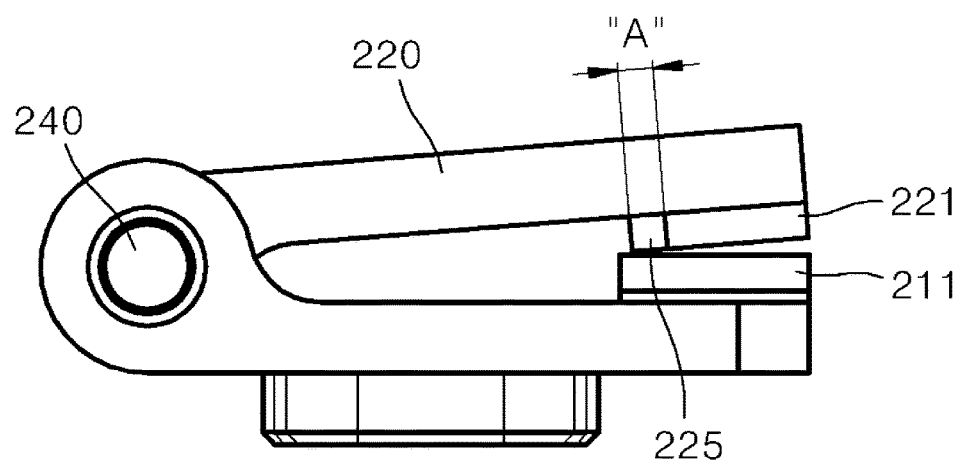
FIG. 7 is an assembled side view of the fixation-holding unit illustrated in FIG. 6.
Figure 8:
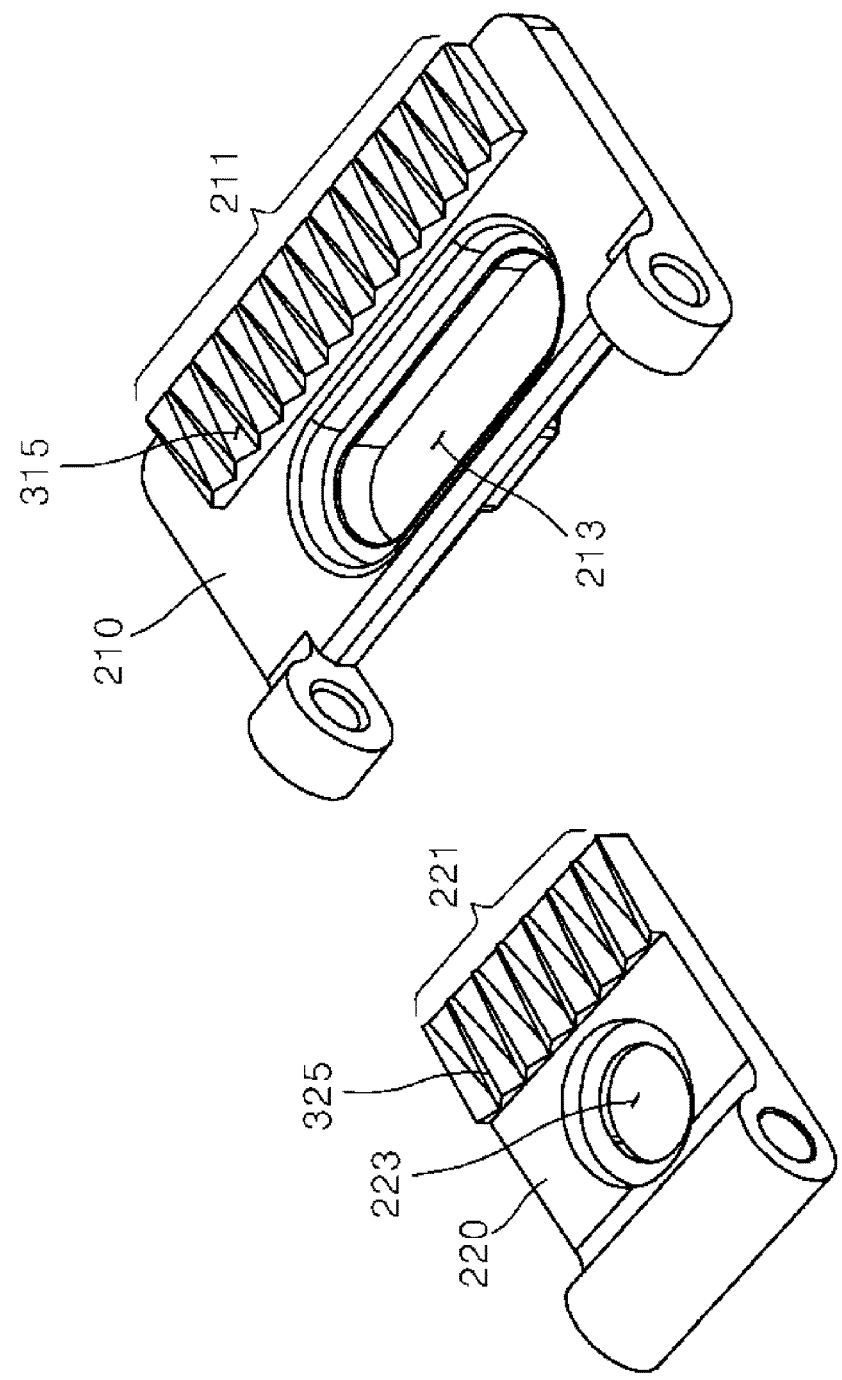
FIG. 8 is an exploded perspective view illustrating another example of a fixation-holding unit in the apparatus for tilting a steering column according to the embodiment of the present invention.
Figure 9:
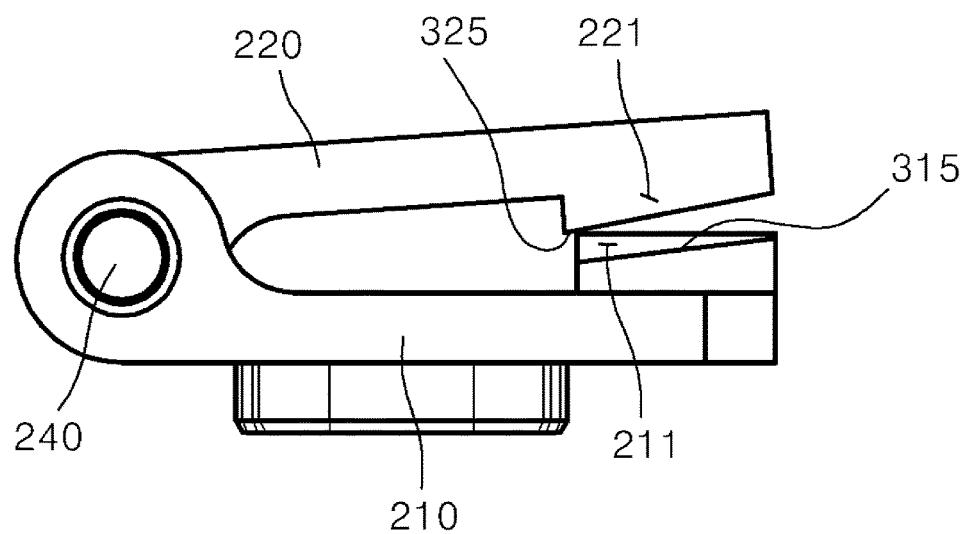
FIG. 9 is an assembled side view of the fixation-holding unit illustrated in FIG. 8.

FIG. 1 is a perspective view illustrating an apparatus for tilting a steering column according to an embodiment of the present invention. FIG. 2 is an exploded perspective view illustrating a state in which a portion of components of FIG. 1 is disassembled. FIG. 3 is a perspective view illustrating a state in which a moving gear is engaged with a fixing gear, among the components of FIG. 1. FIG. 4 is a perspective view illustrating a state in which the moving gear is disengaged from the fixing gear, among the components of FIG. 1. FIG. 5 is a perspective view illustrating a fixation-holding unit, among the components of FIG. 1. FIG. 6 is an exploded perspective view illustrating a preferable example of a fixation-holding unit in the apparatus for tilting a steering column according to the embodiment of the present invention. FIG. 7 is an assembled side view of the fixation-holding unit illustrated in FIG. 6. FIG. 8 is an exploded perspective view illustrating another example of a fixation-holding unit in the apparatus for tilting a steering column according to the embodiment of the present invention. FIG. 9 is an assembled side view of the fixation-holding unit illustrated in FIG. 8.

As illustrated in FIGS. 1 to 4, the apparatus for tilting a steering column, which is designated by reference numeral 100, according to the embodiment of the present invention includes a tilt bracket which supports a column tube 110 of a steering column, a mounting bracket which is fixed to a predetermined portion of a vehicle and supports the tilt bracket such that the tilt bracket is movable up and down depending on the selection of a user, and an operating lever 140 which is coupled to the tilt bracket and adjusts the position of the tilt bracket relative to the mounting bracket depending on the operation of the user.

Here, the mounting bracket may include a central fixing part 120 which is fixed to the predetermined portion of the vehicle, and left and right side fixing parts 121 and 122 which extend laterally from the central fixing part 120. Through such a structure, the mounting bracket is coupled to the tilt bracket.

The tilt bracket may include a main coupling part 130 which is coupled to the central fixing part 120 of the mounting bracket while coming into surface contact therewith, and which is pressed and fastened in a plurality of places so as to be moved relative thereto in order to reduce a handle pushing force applied by the driver according to the degree of impact in the event of collision of the vehicle, and a first side part 131 and a second side part 132, which respectively extend from both ends of the main coupling part 130 so as to surround the outer peripheral surface of the column tube 110. One of the first and second side parts 131 and 132 is fixed to the left side fixing part 121 of the mounting bracket, and the other is fixed to the right side fixing part 122 of the mounting bracket.

The operating lever 140 may be coupled to the outside of the first side part 131 so as to be rotatable by a predetermined angle. The operating lever 140 may be coupled to one end of a tilt shaft 230 which is arranged through the first and second side parts 131 and 132, and be rotated about the tilt shaft 230.

Meanwhile, the tilt shaft 230 is arranged through the first and second side parts 131 and 132, and may longitudinally reciprocate by a predetermined distance depending on an angle of rotation of the operating lever 140. The other end of the tilt shaft 230 passes through the first and second side parts 131 and 132 and protrudes outward from the second side part 132 by a predetermined length.

The apparatus for tilting a steering column 100 according to the embodiment of the present invention may include a fixation-holding unit 200 which is coupled to the other end of the tilt shaft 230 in the outside of the second side part 132, and which unfixes the steering column from a vehicle body such that the steering column may tilt up and down along with the movement (reciprocation) of the tilt shaft 230, or fixes the steering column to the vehicle body.

When the user moves the tilt shaft 230 toward the second side part 132 by rotating the operating lever 140 by a predetermined angle, the fixation-holding unit 200 unfixes the steering column from the vehicle body, with the consequence that the steering column may tilt up or down such that the distance between the steering handle and the driver is decreased or increased. On the other hand, when the user moves the tilt shaft 230 toward the first side part 131, the fixation-holding unit 200 fixes the steering column to the vehicle body, with the consequence that the steering column is not tilted up and down any more.

In more detail, the fixation-holding unit 200 may include a fixing gear 210 which is securely fixed to the vehicle body, and a moving gear 220 which is disposed outside the second side part 132 so as to be rotatable about a rotary shaft 240 formed in the fixing gear 210 by a predetermined angle through the operation of the operating lever 140.

The other end of the tilt shaft 230 extends outward from the second side part 132 by a predetermined length through the fixing gear 210, and extends outward through the moving gear 220 which is disposed outside the fixing gear 210 so as to come into surface contact therewith.

The fixing gear 210 may have a tilt slot 213 which is formed therethrough and through which the movement of the tilt shaft 230 is guided, so that the steering column may tilt up and down.

As illustrated in FIGS. 3 to 5, the moving gear 220 may be rotatably fixed at one end thereof by the rotary shaft 240 provided at the end of the fixing gear 210, and the other end of the moving gear 220 may be coupled, such that the surface thereof facing the fixing gear 210 comes into contact with one surface of the fixing gear 210 facing the same, while rotating by a predetermined angle.

Here, the moving gear 220 may move along the rotary shaft 240 by a predetermined distance when the steering column tilts up and down by the user.

Meanwhile, the other end of the tilt shaft 230, which extends through the moving gear 220, may be coupled to the outside of the moving gear 220 by a predetermined coupling unit. The moving gear 220 may be formed with a tilt shaft through-hole 223 through which the tilt shaft 230 passes.

As illustrated in FIG. 2, the predetermined coupling unit may include a pressure spring pulley 260 around which one end of a pressure spring 250 is wound, the pressure spring 250 allowing the other end of the tilt shaft 230 to pass therethrough and pressing the moving gear 220 to the fixing gear 210, the pressure spring 250, one end of which is wound around the pressure spring pulley 260 while the other end thereof is fixed to the vehicle body, and a coupling nut 290 which is coupled to the other end of the tilt shaft 230 protruding outward from the pressure spring pulley 260.

Of course, the other end of the tilt shaft 230 is formed with a male thread (not shown) to which the coupling nut 290 may be screwed.

A first washer 270 and a second washer 275, through which the nut coupling is performed, may be interposed between the coupling nut 290 and the pressure spring pulley 260. A needle roller cage 280 may be interposed between the first and second washers 270 and 275.

As illustrated in FIG. 4, when the tilt shaft 230 moves toward the second side part 132 by the operation of the operating lever 140, the other end of the moving gear 220 is rotated outward by a predetermined angle about the rotary shaft 240 by overcoming the elastic force of the pressure spring 250, so that the contact between the moving gear 220 and the fixing gear 210 is released. Consequently, the steering column is unfixed from the vehicle body to thereby tilt up and down.

In addition, when the tilt shaft 230 moves toward the first side part 131 by the operation of the operating lever 140, the other end of the moving gear 220 is rotated toward the fixing gear 210 by a predetermined angle about the rotary shaft 240 by the elastic force of the pressure spring 250, so that the moving gear 220 comes into contact with the fixing gear 210. Consequently, the steering column is fixed to the vehicle body so as not to tilt up and down.

Here, the fixation-holding unit 200 may include a guide protrusion 225 formed on the surfaces of the moving gear 220 facing the fixing gear 210 in order to prevent poor contact and contact noise through the first contact of the guide protrusion 225 when the fixing gear 210 comes into contact with the moving gear 220.

A rack gear part 211 for engaging with the moving gear 220 may be formed on one surface of the fixing gear 210 facing the moving gear 220, so as to protrude therefrom. A stopper gear part 221 engaging with the rack gear part may be formed on one surface of the moving gear 220 facing the fixing gear 210, so as to protrude therefrom. That is, the fixing gear 210 engages with the moving gear 220 when they come into contact with each other, thereby preventing the moving gear 220 from moving along the rotary shaft 240 in the direction in which the steering column tilts up and down. As a result, the tilt shaft 230 is fixed.

Here, the guide protrusion 225 may be one of a plurality of gear teeth forming the stopper gear part 221.

In a preferable example of a fixation-holding unit 200 illustrated in FIG. 6, the fixation-holding unit 200 may include a single guide gear part formed in one of a rack gear part 211 of a fixing gear 210 and a stopper gear part 221 of a moving gear 220. In the embodiment of the present invention, a guide protrusion 225 may be formed in the moving gear 220 having the stopper gear part 221.

The guide protrusion 225 may be located at the intermediate one of a plurality of gear teeth forming the stopper gear part 221, but the present invention is not limited thereto. For example, the guide protrusion 225 may be formed at any position as long as it functions described above.

In addition, the guide protrusion 225 may have the same shape as one of the gear teeth forming the stopper gear part 221, and may extend further than the stopper gear part 221 by a predetermined length (see "A" in the drawing) in the direction of the rotary shaft 240 of the fixing gear 210.

When the guide protrusion 225 extends further than the stopper gear part 221 by the predetermined length, the guide protrusion 225 is first engaged with the rack gear part 211 when the moving gear 220 rotates toward the fixing gear 210 about the rotary shaft 240 thereof, as illustrated in FIG. 7. In this case, if the moving gear 220 is located at a position in which it is not engaged with the rack gear part 211 in place, the position of the moving gear 220 is instantaneously aligned by the guide protrusion 225 and the guide protrusion 225 guides the alignment of the remaining gear teeth.

Meanwhile, in another example of a fixation-holding unit 200 illustrated in FIG. 9, a rack gear part 211 for engaging with a moving gear 220 may be formed on one surface of a fixing gear 210 facing the moving gear 220, so as to protrude therefrom, and a thread valley 315 of the rack gear part 211 may have a depth and a width which are gradually increased toward the rotary shaft 240 of the fixing gear 210. In addition, a stopper gear part 221 engaging with the rack gear part 211 may be formed on one surface of the moving gear 220 facing the fixing gear 210, so as to protrude therefrom, and a thread ridge 325 of the stopper gear part 221 may have a shape that engages with the thread valley 315 of the rack gear part 211. Consequently, the thread valley 315 of the rack gear part 211 and the thread ridge 325 of the stopper gear part 221 may be embodied to perform the same function as that of the guide protrusion 225 in the above preferable example.

That is, in the fixation-holding unit 200 according to another example, the thread valley 315 of the rack gear part 211 and the thread ridge 325 of the stopper gear part 221 are formed to have a shape that minimizes an area occupied by a first contact portion when they come into contact with each other, as illustrated in FIG. 9. Consequently, the thread valley 315 of the rack gear part 211 and the thread ridge 325 of the stopper gear part 221 may be embodied to perform the same function as that of the guide protrusion 225 in the above preferable example.

Here, the stopper gear part 221 extends further than the rack gear part 211 by a predetermined length in the direction of the rotary shaft 240. Accordingly, if the moving gear 220 is located at a position in which it is not engaged in place as in the guide protrusion 225 of the above preferable example, the position of the moving gear 220 may be further aligned through the above structure.

The apparatus for tilting a steering column 100 according to the exemplary embodiment of the present invention can have a simple structure by virtue of various examples of the fixation-holding unit 200. In addition, it is possible to prevent the emotional quality of product from deteriorating by reducing mechanical noise when the operating lever 140 is operated to tilt the steering column.

Although the present invention has been described with respect to the illustrative embodiments, it will be apparent to those skilled in the art that various variations and modifications may be made without departing from the spirit and scope of the invention as defined in the following claims.

INDUSTRIAL APPLICABILITY

In accordance with the present invention, it is possible to manufacture an apparatus for tilting a steering column, capable of preventing mechanical noise and resolving faulty operation when an operating lever is operated.

What is claimed is:

1. An apparatus for tilting a steering column, comprising:
a tilt bracket coupled to a mounting bracket, for fixing a steering column tube in a predetermined portion of a vehicle, with the column tube interposed therebetween, so that the column tube tilts in a tele-out and tele-in manner relative to the mounting bracket when an operating lever is operated;
a tilt shaft, one end of which is connected to the operating lever arranged outside a first side part of the tilt bracket, the other end thereof extending outward through the first side part and a second side part facing the first side part; and
a fixation-holding unit comprising a fixing gear and a moving gear coupled to the second side part, and coupled to the other end of the tilt shaft extending through the second side part, thereby enabling the tilt bracket to be tilted or not tilted while the fixing gear and the moving gear come into contact with or are decoupled from each other when the operating lever is operated,
wherein the fixing gear is fixed outside the second side part of the tilt bracket, and the moving gear is arranged to be rotatable about a rotary shaft provided in the fixing gear and be movable along the rotary shaft.

2. The apparatus according to claim 1, wherein the fixation-holding unit further comprising a guide protrusion in order to prevent poor contact and contact noise through first contact of the guide protrusion when the fixing gear comes into contact with the moving gear.

3. The apparatus according to claim 2, wherein:
a rack gear part for engaging with the moving gear is formed on one surface of the fixing gear facing the moving gear;
a stopper gear part engaging with the rack gear part is formed on one surface of the moving gear facing the fixing gear; and
the guide protrusion is one of a plurality of gear teeth forming the stopper gear part.

4. The apparatus according to claim 3, wherein the guide protrusion is located at an intermediate one of the gear teeth forming the stopper gear part.

5. The apparatus according to claim 3, wherein the guide protrusion has the same shape as one of the gear teeth forming the stopper gear part, and extends further than the stopper gear part by a predetermined length in a direction of the rotary shaft.

6. The apparatus according to claim 2, wherein:
a rack gear part for engaging with the moving gear is formed on one surface of the fixing gear facing the moving gear, and a thread valley of the rack gear part has a depth and a width which are gradually increased toward the rotary shaft; and
a stopper gear part engaging with the rack gear part is formed on one surface of the moving gear facing the fixing gear, and a thread ridge of the stopper gear part has a shape that engages with the thread valley of the rack gear part.

7. The apparatus according to claim 6, wherein the stopper gear part extends further than the rack gear part by a predetermined length in a direction of the rotary shaft.

* * * * *